United States Patent Office 3,393,212
Patented July 16, 1968

3,393,212
DERIVATIVES OF 4α,8,14-TRIMETHYL-18-NOR-5α,8α,14β-ANDROSTANES
Patrick A. Diassi, Westfield, and Gerald W. Krakower, Elizabeth, N.J., assignors, by mesne assignments, to E. R. Squibb & Sons, Inc., New York, N.Y., a corporation of Delaware
No Drawing. Filed June 14, 1965, Ser. No. 463,859
5 Claims. (Cl. 260—397.45)

ABSTRACT OF THE DISCLOSURE

This invention relates to derivatives of 4α,8,14-trimethyl-18-nor-5α,8α,14β-androstanes. The compounds of this invention possess anti-androgenic, anti-estrogenic and anti-gonadotrophic activity.

---

This invention relates to and has as its object the provision of new physiologically active steroids, novel methods for their production and new intermediates useful in said preparation. More particularly, this invention relates to the preparation of compounds of the formula

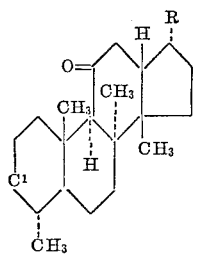

wherein $C^1$ is

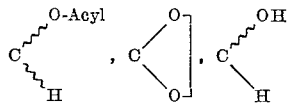

or C=O, and R is hydroxyl or acyloxy.

The novel compounds of this invention are pharmacologically active substances that possess anti-androgenic activity (i.e., they can be utilized in the treatment of such conditions as hyperandrogenic acne). They are also useful as anti-estrogenic and anti-gonadotrophic agents. The compounds may be formulated for such administration, the concentration and/or dosage being based on the activity of the particular compound and the requirements of the patent. Acyl represents the acyl moiety of an acid group consisting of a lower alkanoic acid of less than twelve carbons, e.g., acetic, propionic, butyric and tert-pentanoic acid; monocyclic hydrocarbon monocarboxylic acids of from six to twelve carbons, e.g., benzoic and toluic acid; and mononuclear aromatic hydrocarbon aralkanoic acids, e.g., phenacetic and β-phenylpropionic acid; the lower alkenoic acids; the cycloalkane-carboxylic acids and the cycloalkenecarboxylic acids; alkoxy represents o-alkyl moieties wherein the alkyl has from one to ten carbons, preferably from one to six carbons, such as ethoxy, pentoxy, isopropoxy, decoxy, and so forth.

The final compounds of this invention may be prepared according to the processes of this invention beginning with 4α,8,14 - trimethyl - 18 - nor - 5α,8α,14β - androstane-3,11,17-trione as a starting material. The preparation of this compound is disclosed in copending U.S. patent application Ser. No. 399,399, filed Sept. 25, 1964, now abandoned. The starting material is first ketalized by reacting it with a dioxolane, e.g., 2-methyl-2-ethyl-1,3-dioxolane, in p-toluenesulfonic acid monohydrate under reflux conditions. It has been surprisingly found that this reaction ketalizes in the 3-position. Other dioxolanes that may be utilized in the practice of this invention are the dioxolanes of acetone and of mesityl oxide.

The ketalized intermediate having oxo groups (=O) in the 11- and 17-positions may then be reduced in only the 17-position by metal hydride reduction. This reaction is carried out at ambient temperatures. It is preferred to utilize sodium borohydride in an absolute alcohol, e.g., methanol, ethanol, and so forth. Hydrolysis of this derivative yields one of the end products of the invention, 17α - hydroxy - 4α,8,14 - trimethyl - 18 - nor - 5α,8α,14β-androstane-3,11-dione. This hydrolysis reaction is carried out utilizing a weak mineral acid, e.g., sulfuric, hydrochloric or hydrobromic acids.

Alternatively, it has been discovered that by reducing the starting material with a metal hydride, preferably sodium borohydride at ambient temperatures, the 3- and 17-positions are reduced to form 3β,17α-dihydroxy-4α,8,14-trimethyl-18-nor-5α,8α,14β - androstane - 11 - one final product, leaving the 11-position unaffected.

Alternatively, when a 3α-acyloxy-4α,8,14-trimethyl-18-nor-5α,8α,14β-androstane-11,17-dione, such as one of those disclosed in copending U.S. patent application Ser. No. 399,339, filed Sept. 25, 1964, is reduced with lithium tri-tert-butoxy-aluminum hydride at reflux temperatures, the 17α-hydroxyl derivative is recovered. This hydroxyl derivative may then be acylated to yield the corresponding 3α,17α-diacyloxy derivative. Another route to the 3α,17α-diacyloxy derivative of the invention is to reduce the starting 3α-acyloxy material with lithium aluminum hydride in tetrahydrofuran and thereafter react the 3α,17α-dihydroxy derivative with 2 molar equivalents of the acylating reagent under acylating conditions to form the 3α,17α-acylated end product.

The invention may be illustrated by the following examples. All temperatures are in degrees centigrade unless otherwise stated.

Example 1.—3-ethylenedioxy-4α,8,14-trimethyl-18-nor-5α,8α,14β-androstane-11,17-dione A solution of 100 mg. of 4α,8,14-trimethyl-18-nor-5α,8α,14β-androstane-3,11,17-trione in 10 ml. of 2-methyl-2-ethyl-1,3-dioxolane containing 50 mg. of p-toluenesulfonic acid monohydrate is refluxed for 25 minutes. The slightly yellow solution formed is cooled and diluted with ether. Pyridine, 0.2 ml., is then added to the solution. The solution is then extracted with water, dried over sodium sulfate and evaporated in vacuo. The residue on crystallization from acetone-hexane gives 70 mg. of 3-ethylenedioxy - 4α,8,14 - trimethyl - 18 - nor - 5α,8α,14β - androstane-11,17-dione, having a melting point about 203–205° C., $[\alpha]_D^{22}$ —137° (chloroform).

Analysis.—Calc'd for $C_{23}H_{34}O_4$ (374.53): C, 73.76; H, 9.15. Found: C, 73.85; H, 9.19.

Example 2.—3-ethylenedioxy-17α-hydroxy-4α,8,14-trimethyl-18-nor-5α,8α,14β-androstane-11-one To a solution of 77 mg. of the compound of Example 1 in 10 ml. of absolute ethanol, 77 mg. of sodium borohydride are added and the mixture stirred at room temperature (about 23° C.) for 90 minutes. The solution is acidified with 10% acetic acid and then diluted with water. The crystals which separate are filtered, washed with water and dried to give 50 mg. of 3-ethylenedioxy-17α-hydroxy-4α,8,14-trimethyl-18 - nor - 5α,8α,14β-androstane-11-one having a melting point about 253–212° C., $[\alpha]_D^{22}$—148° (chloroform).

Analysis.—Calc'd for $C_{23}H_{36}O_4$ (376.52): C, 73.36; H, 9.64. Found: C, 73.54; H, 9.49.

Example 3.—17α-hydroxy-4α,8,14-trimethyl-18-nor-5α,8α,14β-androstane-3,11-dione

A solution of 50 mg. of the compound of Example 2 in 10 ml. of methanol containing 0.35 ml. of 8% sulfuric acid is refluxed for 1 hour. The solution is then partially evaporated, then diluted with water and extracted with chloroform. The chloroform is washed with water, evaporated and the residue crystallized from acetone-hexane to give 31 mg. of 17α-hydroxy-4α,8,14-trimethyl-18-nor-5α,8α,14β-androstane-3,11-dione, having a melting point about 222–224° C., $[\alpha]_D$—157° (chloroform).

*Analysis.*—Calc'd for $C_{21}H_{32}O_3$ (332.47): C, 75.86; H, 9.70. Found: C, 75.94; H, 9.75.

Example 4.—3β,17α-dihydroxy-4α,8,14-trimethyl-18-nor-5α,8α,14β-androstane-11-one To a suspension of 100 mg. of 4α,8,14-trimethyl-18-nor-5α,8α,14β-androstane-3,11,17-trione in 10 ml. of ethanol, 100 mg. of sodium borohydride are added and the mixture stirred at room temperature (about 23° C.) for 60 minutes. The solution is acidified with 10% acetic acid then diluted with water and extracted with chloroform. The chloroform is washed with water and evaporated to dryness in vacuo. The residue on crystallization from acetone-hexane gives 3β,17α-dihydroxy-4α,8,14-trimethyl-18-nor-5α,8α,14β - androstane - 11 - one, having a melting point about 250–252° C., $[\alpha]_D^{22}$—143° (absolute ethanol).

*Analysis.*—Calc'd for $C_{21}H_{34}O_3$ (334.48): C, 75.40; H, 10.25. Found: C, 75.39; H, 10.30.

Example 5.—3α-acetoxy-17α-hydroxy-4α,8,14-trimethyl-18-nor-5α,8α,14β-androstane-11-one A solution of 316 mg. of 3α-acetoxy-4α,8,14-trimethyl-18-nor-5α,8α,14β-androstane-11,17-dione and 875 mg. of lithium tri-tert-butoxyaluminum hydride in 30 ml. of tetrahydrofuran (freshly distilled from lithium aluminum hydride) is heated at reflux temperature for 2 hours. After addition of water and acidification with glacial acetic acid, the solvent is evaporated. The residue is taken up in ethyl acetate and the solution washed with saturated salt solution, dried and evaporated to give 295 mg. of crude product. Recrystallization from methanol gives 218 mg. of 3α-acetoxy-17α-hydroxy - 4α,8,14 - trimethyl-18-nor-5α,8α,14β-androstane-11-one, M.P. 241–243° C. The analytical sample has a M.P. 245–247° C., $[\alpha]_D$—176° (chloroform).

*Analysis.*—Calc'd for $C_{23}H_{36}O_4$ (376.5): C, 73.36; H, 9.64. Found: C, 73.39; H, 9.69.

Example 6.—3α,17α-diacetoxy-4α,8,14-trimethyl-18-nor-5α,8α,14β-androstane-11-one (a) A solution of 70 mg. of 3α-acetoxy-17α-hydroxy-4α,8,14-trimethyl-18-nor-5α,8α,14β-androstane-11-one in 2 ml. of pyridine and 1 ml. of acetic anhydride is kept at room temperature. After 17 hours, the reaction mixture is diluted with water and evaporated. Crystallization from methanol gives 40 mg. of 3α,17α-diacetoxy-4α,8,14-trimethyl-18-nor-5α,8α,14β-androstane-11-one, M.P. 154–156° C., $[\alpha]_D$—107° (chloroform).

*Analysis.*—Calc'd for $C_{25}H_{38}O_5$ (418.6): C, 71.74; H, 9.15. Found: C, 71.82; H, 9.21.

(b) When 3α,17α-dihydroxy - 4α,8,14-trimethyl-18-nor-5α,8α,14β-androstane-11-one is treated with pyridine and aectic anhydride as described above, 3α,17α-diacetoxy-4α, 8,14-trimethyl-18-nor-5α,8α,14β-androstane-11-one is obtained, MP. 155–157° C., and identical in all respects with the material described above.

Example 7.—3α,17α-dihydroxy-4α,8,14-trimethyl-18-nor-5α,8α,14β-androstane-11-one A suspension of 100 mg. of lithium aluminum hydride in 5 ml. of tetrahydrofuran is added to a solution of 92 mg. of 3α-acetoxy-4α,8,14-trimethyl-18-nor-5α,8α,14β-androstane-11,17-dione in 5 ml. of tetrahydrofuran and the mixture is heated at reflux for one hour. The reaction mixture is cooled and a saturated sodium sulfate solution is added slowly until two layers form. The organic layer is decanted, washed with saturated salt solution, dried and evaporated to give 86 mg. of crude product. Two recrystallizations from ether-hexane give 22 mg. of 3α,17α-dihydroxy-4α,8,14 - trimethyl - 18 - nor - 5α,8α,14β-androstane-11-one, M.P. 205–207° C., $[\alpha]_D$—165° (chloroform). The analytical sample has M.P. 207–208° C.

*Analysis.*—Calc'd for $C_{21}H_{34}O_3$ (334.5): C, 75.40; H, 10.25. Found: C, 75.37; H, 10.30.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A compound having the formula

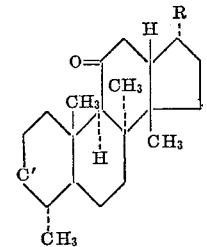

wherein C' is

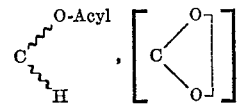

or

[or C=O], and R is hydroxyl or acyloxy.

2. 3β,17α-dihydroxy-4α,8,14 - trimethyl - 18-nor-5α,8α, 14β-androstane-11-one.

3. 3α-acetoxy-17α-hydroxy - 4α,8,14 - trimethyl-18-nor-5α,8α,14β-androstane-11-one.

4. 3α,17α-diacetoxy - 4α,8,14 - trimethyl - 18-nor-5α,8α, 14β-androstane-11-one.

5. 3α,17α-dihydroxy - 4α,8,14 - trimethyl - 18-nor-5α,8α, 14β-androstane-11-one.

References Cited

UNITED STATES PATENTS 3,316,281   4/1967   Diassi et al. _____ 260—397.3

LEWIS GOTTS, *Primary Examiner.*

E. G. LOVE, J. R. BROWN, *Assistant Examiners.*

UNITED STATES PATENT OFFICE
CERTIFICATE OF CORRECTION

Patent No. 3,393,212                                          July 16, 1968

Patrick A. Diassi et al.

It is certified that error appears in the above identified patent and that said Letters Patent are hereby corrected as shown below:

Column 1, line 54, "patent" should read -- patient --; line 71, "399,399" should read -- 399,339 --. Column 2, line 69, "212°" should read -- 255° --. Column 3, line 66, "aectic" should read -- acetic --. Column 4, lines 43 to 47, the formula should appear as shown below:

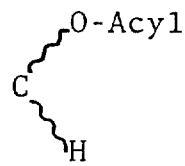

same column 4, line 53, cancel "[or C=O]".

Signed and sealed this 3rd day of February 1970.

(SEAL)
Attest:

EDWARD M. FLETCHER, JR.                      WILLIAM E. SCHUYLER, JR
Attesting Officer                               Commissioner of Patents